Figure 1:
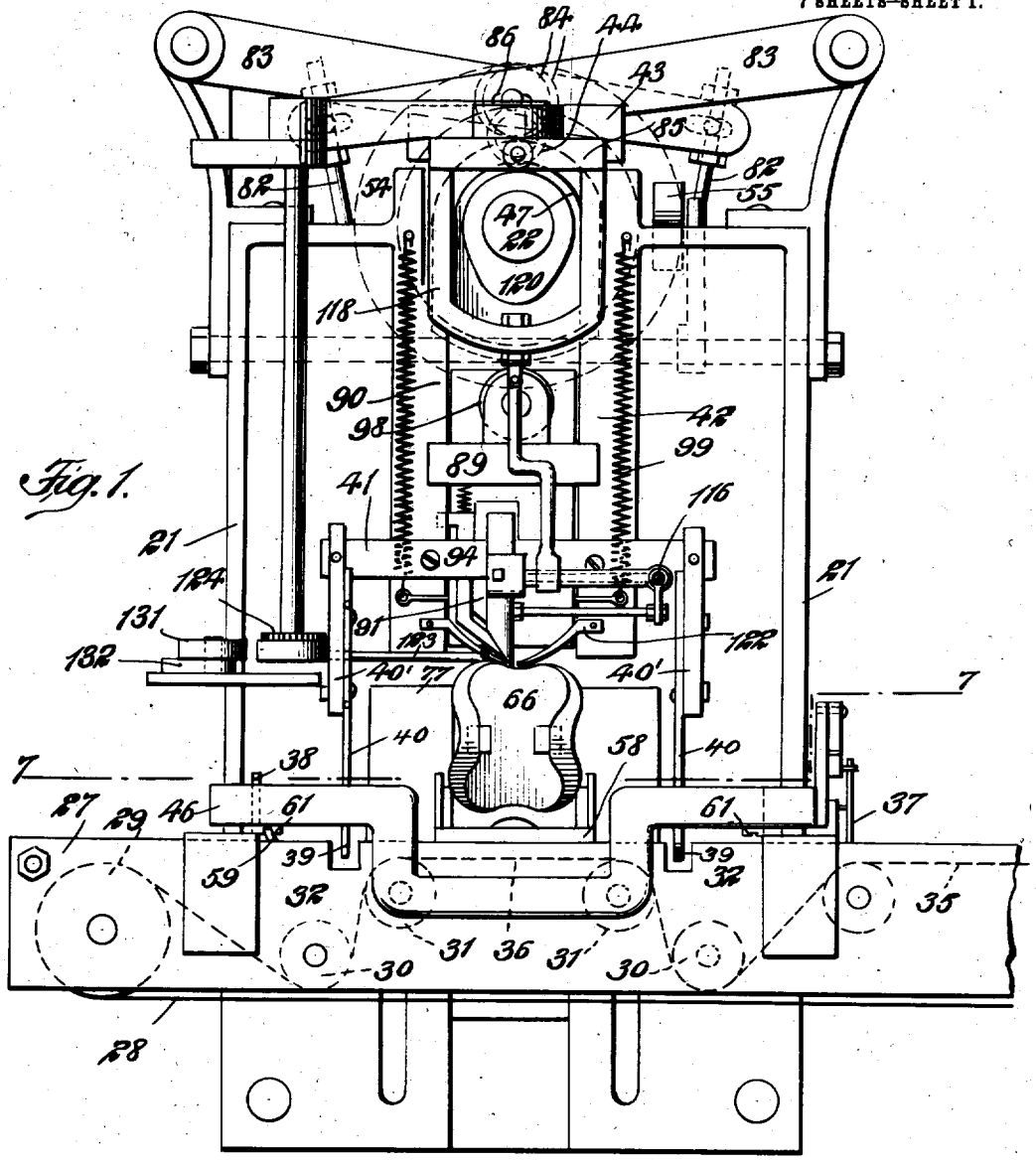
Figure 1A:
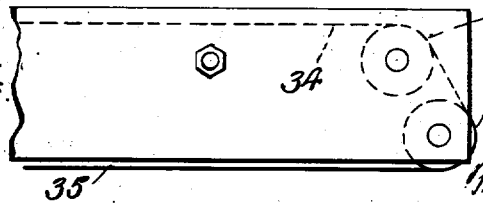

J. BRENZINGER.

MACHINE FOR MAKING CAN BODIES.

APPLICATION FILED JAN. 21, 1908.

Reissued Nov. 19, 1912.

13,487.

7 SHEETS—SHEET 1.

WITNESSES

INVENTOR

BY

ATTORNEYS

J. BRENZINGER.
MACHINE FOR MAKING CAN BODIES.
APPLICATION FILED JAN. 21, 1908.
Reissued Nov. 19, 1912. 13,487.
7 SHEETS—SHEET 2.
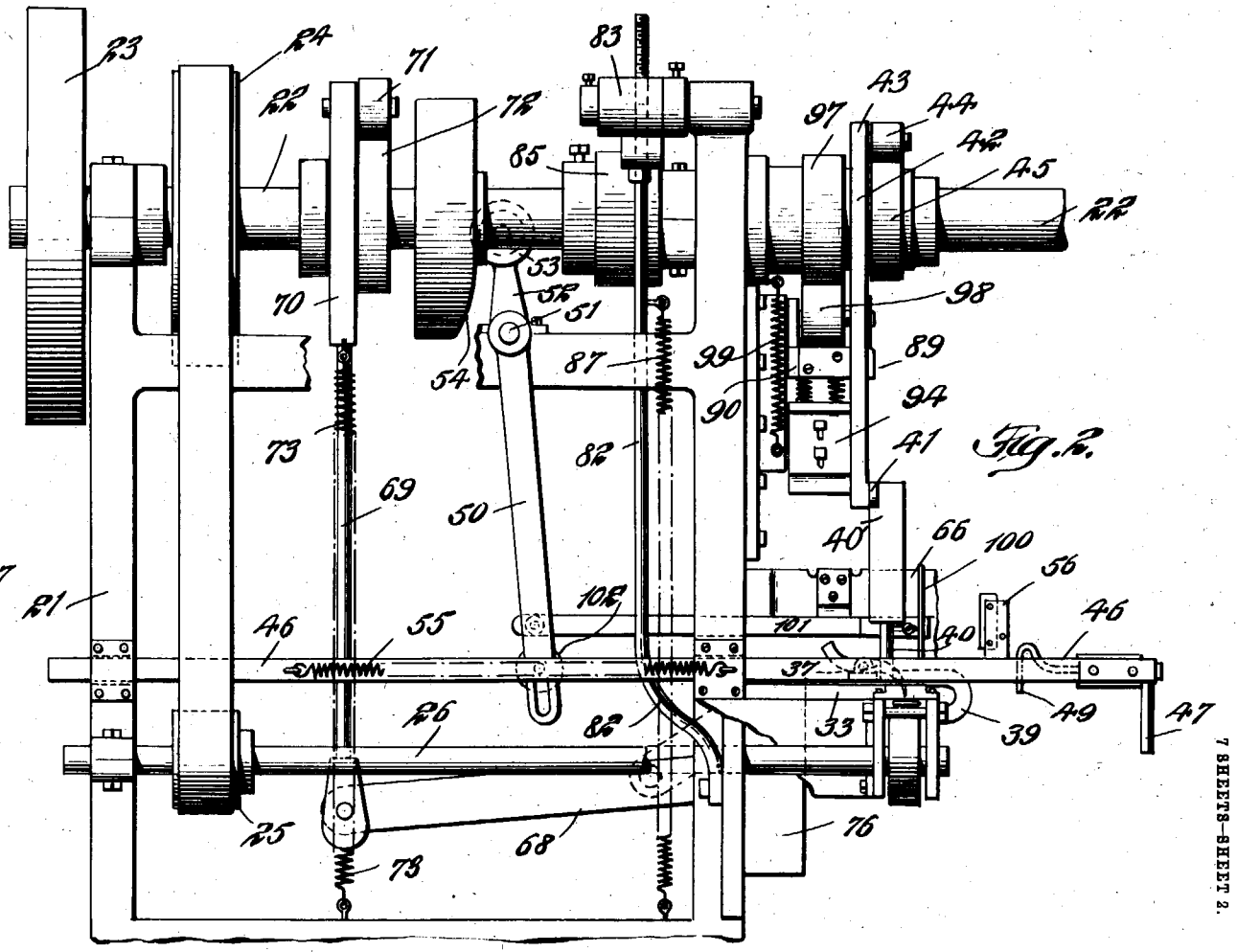
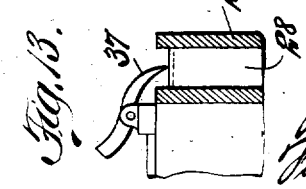
WITNESSES
Julius A. Fritz
P. G. Lanick
INVENTOR
Julius Brenzinger
BY
Fred H. Rousseau
ATTORNEYS

J. BRENZINGER.

MACHINE FOR MAKING CAN BODIES.

APPLICATION FILED JAN. 21, 1908.

Reissued Nov. 19, 1912.

13,487.

7 SHEETS—SHEET 3.

WITNESSES

Jules H. Katz

P. V. Lanick

INVENTOR

Julius Brenzinger

BY

Fred H. Bowerman

ATTORNEYS

J. BRENZINGER.

MACHINE FOR MAKING CAN BODIES.

APPLICATION FILED JAN. 21, 1908.

Reissued Nov. 19, 1912.

13,487.

7 SHEETS—SHEET 4.

WITNESSES

Julius H. Katz

P. F. Somers

INVENTOR

Julius Brenzinger

BY

Wm. H. Bowerson

ATTORNEYS

J. BRENZINGER.

MACHINE FOR MAKING CAN BODIES.

APPLICATION FILED JAN. 21, 1908.

Reissued Nov. 19, 1912.

13,487.

7 SHEETS—SHEET 5.

WITNESSES

Julius H. Pitz

C. F. Sawyer

INVENTOR

Julius Brenzinger

BY

Thos. H. Dowerson

ATTORNEYS

J. BRENZINGER.

MACHINE FOR MAKING CAN BODIES.

APPLICATION FILED JAN. 21, 1908.

Reissued Nov. 19, 1912. 13,487.

7 SHEETS—SHEET 6.

WITNESSES

Julius A. Kuhl

P. F. Lenck

INVENTOR

Julius Brenzinger

BY

Fred H. Bowerman

ATTORNEYS

J. BRENZINGER.

MACHINE FOR MAKING CAN BODIES.

APPLICATION FILED JAN. 21, 1908.

Reissued Nov. 19, 1912. 13,487.

7 SHEETS—SHEET 7.

WITNESSES

Julius A. Rutz

P. F. Samek

INVENTOR

Julius Brenzinger

BY

Geo. H. Dowrussia

ATTORNEYS

UNITED STATES PATENT OFFICE.

JULIUS BRENZINGER, OF MOUNT VERNON, NEW YORK, ASSIGNOR TO SANITARY CAN MACHINERY COMPANY, OF NEW YORK, N. Y., A CORPORATION OF NEW YORK.

MACHINE FOR MAKING CAN-BODIES.

13,487. Specification of Reissued Letters Patent. Reissued Nov. 19, 1912.

Original No. 815,791, dated March 20, 1906, Serial No. 127,286. Application for reissue filed January 21, 1908. Serial No. 411,978.

*To all whom it may concern:*

Be it known that I, JULIUS BRENZINGER, a citizen of the United States, and a resident of Mount Vernon, in the county of Westchester and State of New York, have invented certain new and useful Improvements in Machines for Making Can-Bodies, of which the following is a specification.

This invention relates to machines for shaping and securing the ends of a sheet metal blank to thereby form the body portion of a container, such as is ordinarily known as a "tin can", with more particular reference to what are known as square cans, that is, cans the body portion of which is of a substantially rectangular configuration with more or less rounded corners. I am aware that it has heretofore been the practice to form these can bodies in a machine by means of which the meeting edges of the blank are first bent into hooks which are subsequently interlocked and compressed to form the side seam. Such an interlocked side-seam may possess certain advantages over the ordinary single-lap soldered seam, but on account of the fact that such a seam provides four layers of metal, it interferes with perfect flanging of the end edges of the can body and even to a greater extent with the provision of an hermetic seam between can body and cover by the well-known "double-seaming" process. On some accounts, therefore, the single-lap soldered side seam is preferable, but it is well known that many difficulties have presented themselves in efforts which have heretofore been made to automatically form and solder these lap-seam can bodies by machinery.

The principal object of the present invention is the provision of a machine to which suitable blanks may be successively fed, and which will automatically form these blanks into can bodies of the desired configuration, permanently secure the meeting edges thereof in a hermetic joint having not exceeding two thicknesses or layers of the metal, and finally discharge or deliver the completed can bodies.

Incidental to the above, this invention has in view means for temporarily securing together the ends of the blank which form the can body preliminary to final and permanent sealing; also, a machine which will form, seal and deliver these can bodies more rapidly than has been possible through any known processes, and the production of a machine comparatively simple in construction and dependable in operation.

With the above and other objects in view, my invention consists in a machine embodying a construction as hereinafter described in detail and particularly pointed out in the claims.

My invention will be more readily understood by reference to the accompanied drawings, forming a part of this specification, and in which—

Figure 2A:
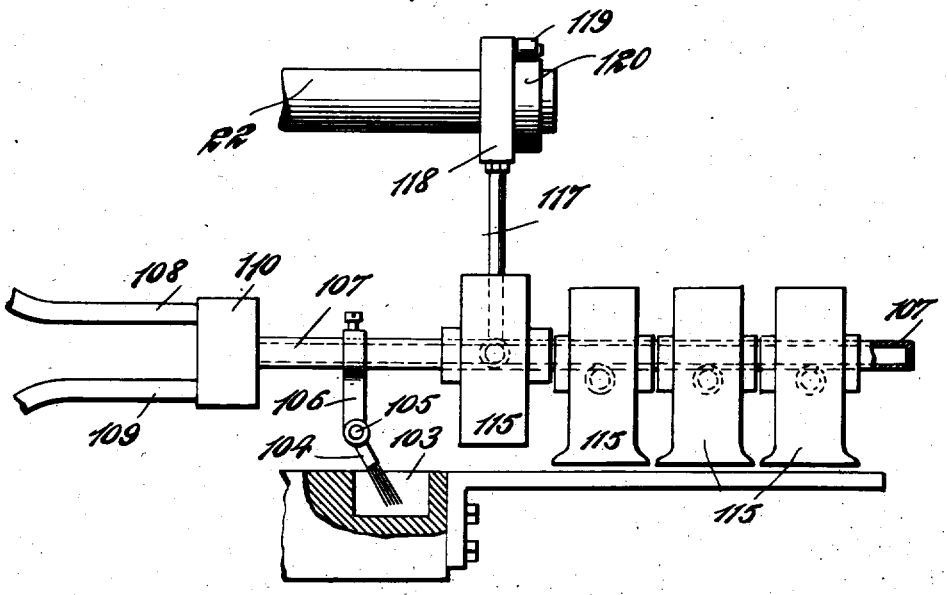
Figure 10:
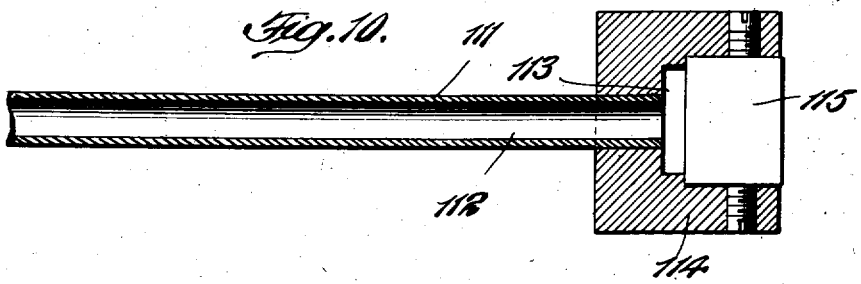
Figure 3:
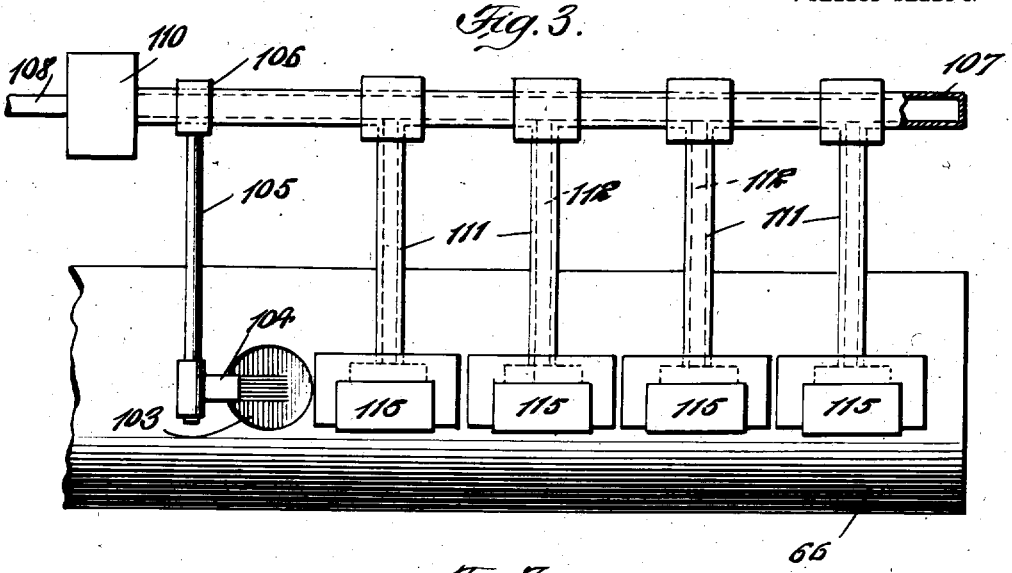
Figure 7:
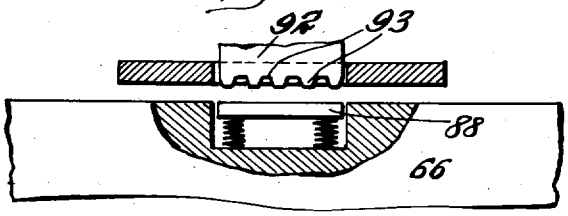
Figure 8:
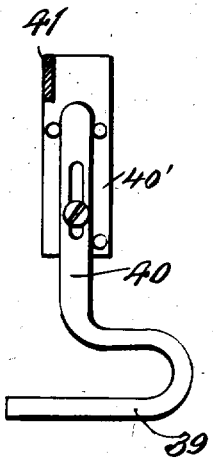
Figure 9:
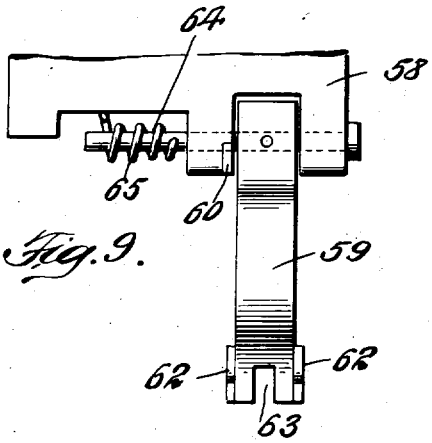
Figure 4:
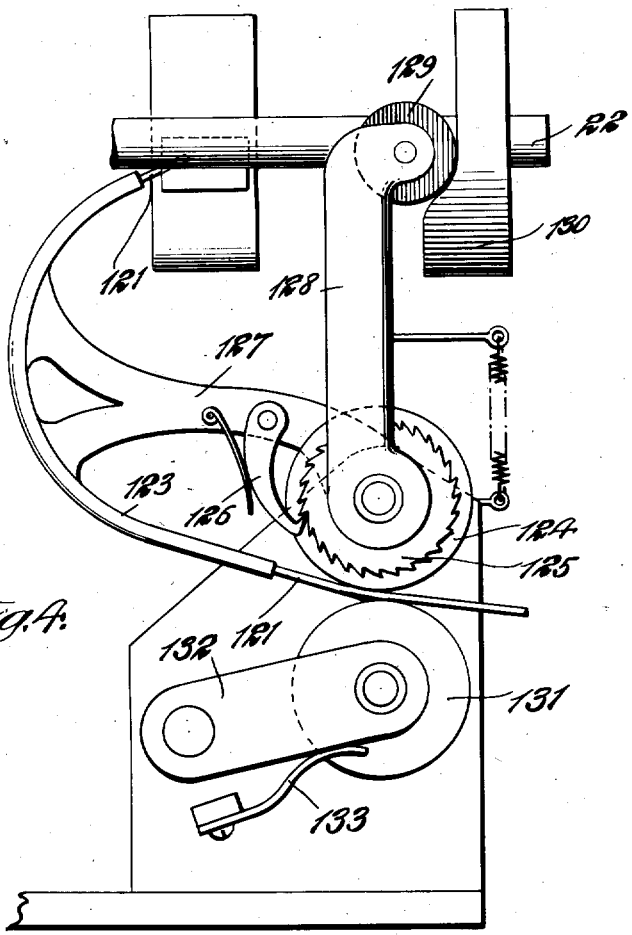
Figure 11:
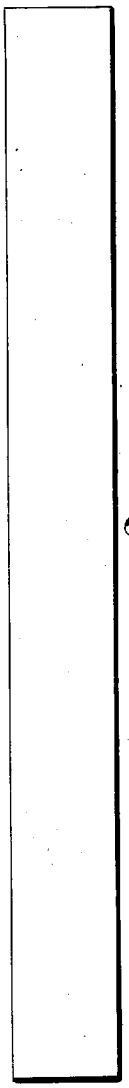
Figure 12:
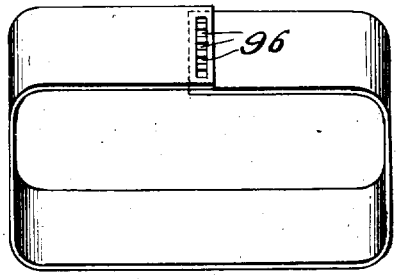
Figure 5:
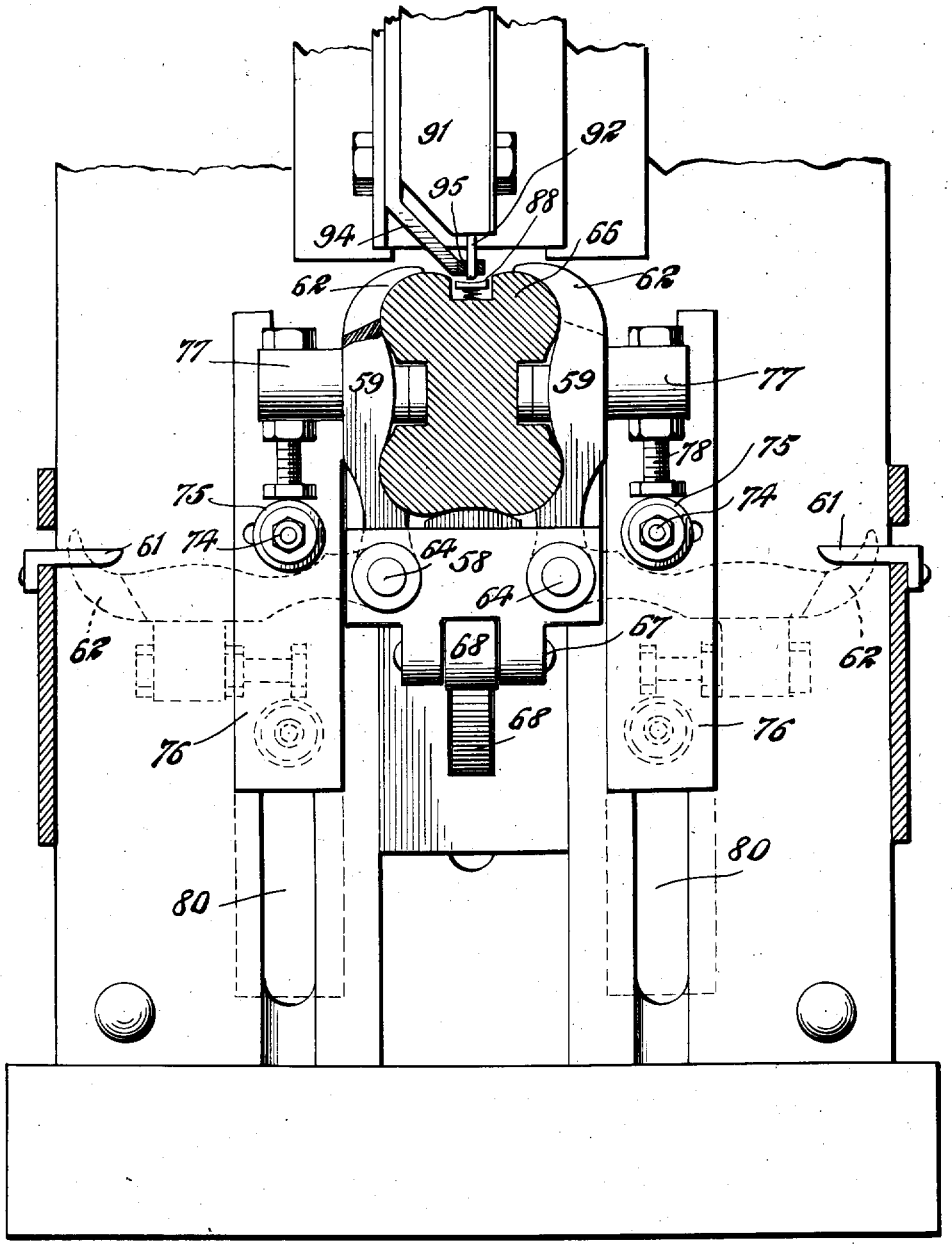
Figure 6:
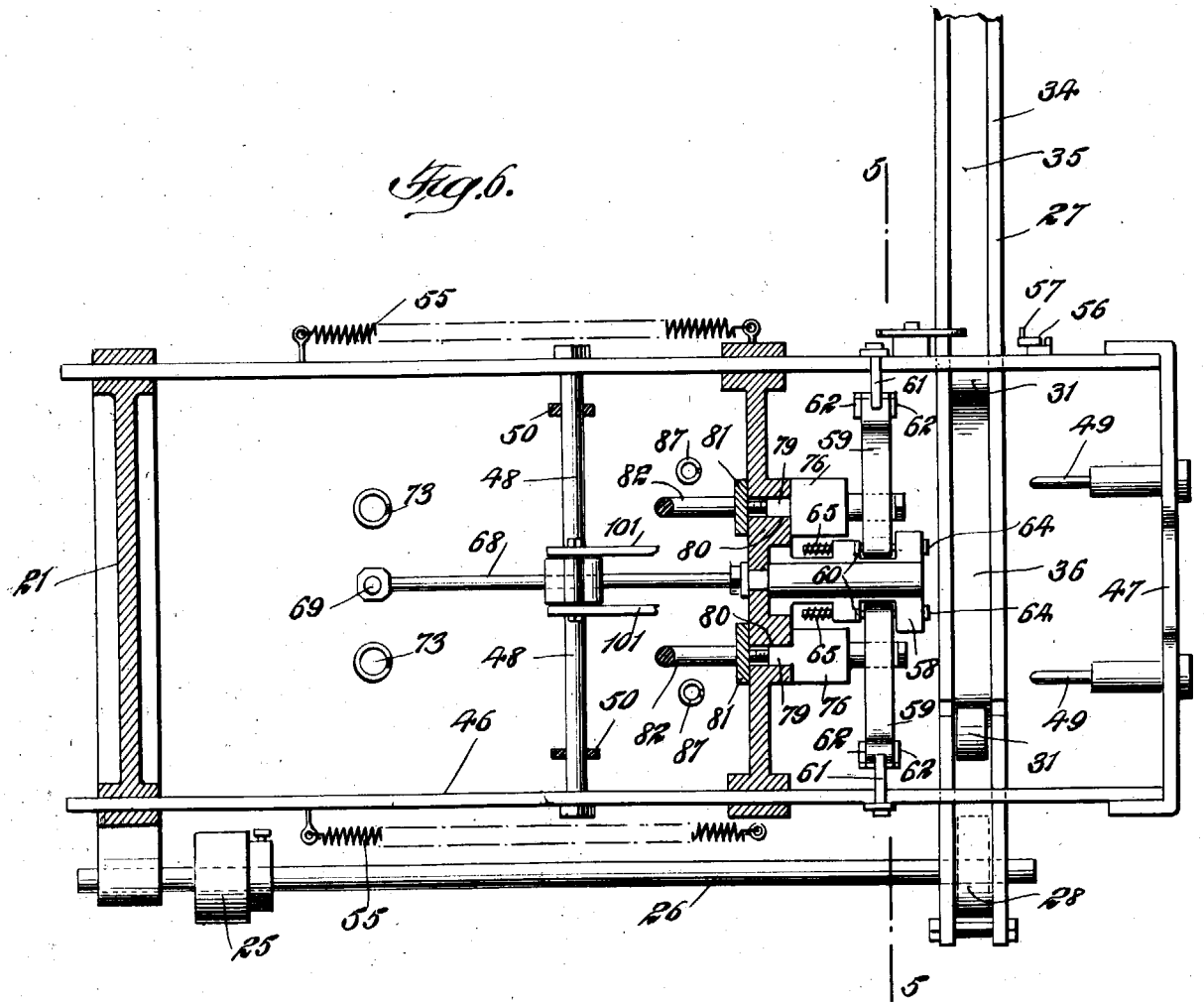

Figure 1 is a front elevation, partly in section, of a machine embodying my invention; Fig. $1^a$ is a continuation to the right of the lower portion of Fig. 1; Fig. 2 is a side elevation of the machine with the soldering mechanism not shown; Fig. $2^a$ is a side elevation showing a continuation of Fig. 2 and illustrating the soldering mechanism; Fig. 3 is a plan view of Fig. $2^a$; Fig. 4 is a side view of the solder-wire-feeding mechanism. Fig. 5 is an enlarged vertical section of the lower part of the machine, substantially on the line 5—5 of Fig. 6; Fig. 6 is a horizontal section, taken substantially on the line of 7—7 of Fig. 1; Fig. 7 is a detail vertical section of the locking-punch dies; Fig. 8 is a detail side view of one of the blank-lifting arms; Fig. 9 is a detail plan view of one of the folding or bending wings; Fig. 10 is a sectional detail of a soldering-iron holder; Fig. 11 is a plan view of the sheet metal blank before it enters the machine; Fig. 12 is a perspective view of the can body after formation, and Fig. 13 is a detail view of the stop-latch, hereinafter described.

Referring now to the drawings in detail, numeral 21, refers to the supporting frame of the machine which carries the operating mechanisms. Horizontally mounted in the upper part of this frame is the main shaft 22 which is preferably driven by the pulley 23 connected in the usual manner to any suitable source of power. The shaft 22 is provided with the driving pulley 24, connected through a belt with the pulley 25 on the shaft 26 which drives the blank-feeding mechanism. I prefer to mount this blank-feeding mechanism within a suitable housing 27 (see Figs. 1 and 6), extending across the front of the machine. This mechanism preferably comprises an endless conveyer belt 28 mounted on and driven by the pulley or roller 29 and passing under and over the idlers 30 and 31, the idlers 31 being so located as to carry the belt at what may be termed the feeding-level of the blanks, and the idlers 30 being mounted in said housing below the idlers 31, so as to carry said belt below said feeding-level and leave spaces 32 in which the mechanism for lifting and transferring the blanks from the conveyer to the forming mechanism may operate without interfering with said belt.

The housing 27 is preferably supported on horizontal arms 33 which may extend, as shown, from the front of the machine a sufficient distance to provide a space between the housing and said frame in which the forming and locking mechanisms may operate. I have shown this housing prolonged on one side of the machine in order to form a receptacle 34 for the blanks, which are placed lengthwise, one at a time, upon the conveyer-belt therein.

That section of the conveyer-belt which I have designated by the numeral 35 carries the blank forward until motion thereof is arrested by a fixed stop 38, which is so located that the blank when stopped has its ends projecting beyond the ends of the belt section 36 and above the spaces 32, where they are in position to be engaged by the lifting mechanism. In order to prevent premature forward movement of the blank in the receptacle, I provide a stop which consists of what may be termed a pivoted latch 37, the end of which is normally in the path of movement of said blank and which is adapted to be raised at the proper time by a trip on the moving part of the mechanism and permit movement of said blank. It will therefore be seen that with the conveyer-belt having continuous movement, a blank placed thereon in the feed receptacle will be checked against movement until the latch 37 is raised, whereupon it will be delivered to and upon the belt section 36 and again checked by the stop 38 in proper position to be engaged by the lifting mechanism. This lifting mechanism comprises a pair of arms 39 operating through suitable vertical slots in the housing 27. These arms 39 have vertical extensions 40 which are adjustably connected through the medium of a connecting block 40′ to a lower cross bar 41 of a vertically-reciprocating frame 42 provided with a top cross-bar 43 carrying a roller 44. This roller 44 bears upon a cam 45 mounted on the main shaft 22, whereby said lifting arms are vertically reciprocated at the proper intervals. The arms normally rest below the feeding-level of the conveyer-belt and when raised engage the ends of the blank which rests upon the belt-section 36, and lift the latter.

In the main frame 21 is suitably mounted a horizontal sliding frame 46 (best shown in Figs. 2 and 6) having a connecting-arm 47 and a cross bar 48. Extending inwardly from the connecting-arm 47, are the pusher-arms 49, preferably in the form of depending hooks, so located and adjusted as to impinge, in their backward movement, against the edge of the blank which has been raised by the arms 39, and slide said blank laterally off of said belt-section 36 and to the forming mechanism. As a preferable means of operating and timing operations of the sliding frame 46, I have shown the cross-bar 48 engaged by the vertically slotted levers 50, fixed to the end of the shaft 51, which is suitably journaled in the frame 21. On this shaft 51 is a fixed rocking arm 52 having a roller 53 adapted to bear upon the cam 54 on the shaft 22. Coiled springs 55 are connected at their respective ends to the arms 46, at or near the rear end of the latter, and the front part of the main frame, and serve to return the sliding frame 46 to its normal position with the pusher arms 49 at their foremost or outermost positions.

One of the side arms of the sliding frame 46 is provided with a pivot trip 56 having a pin 57 adapted to engage and raise the stop-latch 37, at the end of the blank receptacle 34, when said sliding frame is carried inward by the cam. In this manner, a blank having been deposited upon the belt-section 36, and subsequently raised to proper position by the lifting-arms 39, as this blank is pushed rearwardly to the forming mechanism by the pusher-arms 49, the latch 37 is raised and permits of the blank which has hereby been withheld upon the belt-section 35, to be carried forward and deposited in proper position for the next succeeding lifting operation—this operation being so timed that the cam 45 has permitted downward movement of the frame 42 to the point where the lifting arms 39 are again below the feeding level. It will be noted that upon the return of the sliding-frame 46, in its forward movement, the trip 56 being pivoted yields to the latch 37, which it thereby passes without raising the latter.

The blanks are pushed by the pusher-arms 49 from the lifting-arms 39 directly upon the presser-block, 58, where they rest in such position that the ends thereof extend over the folding-wings 59 (see Figs. 5 and 6). Rearward movement of each blank under action of said pusher-arms is limited by the uprights 60, which form stops and guides, and each in turn rests upon the horizontal lugs 61 so as to be sustained above the curved folding-wings without bending. Each of said wings is of the proper width to accommodate the blanks and is provided on each side with outside guide-lugs 62, which extend above the ends of the wings and are adapted to embrace the blanks and hold them in proper position on each of said wings. Each wing is also provided with a slot 63, which extends through its end, to enable the wing to pass the fixed lug 61. Each of said wings is furthermore fixed on a shaft 64, suitably journaled in the presser-block 58, and a spring 65 is provided operating between a pin on the shaft 64 and the block 58 to continuously subject said wing to yielding pressure tending to retain the same in its normal horizontal or open position and to give said wing a quick return when closed.

Fixed to the frame of the machine above the block 58, and extending horizontally forward, is a forming or supporting horn or mandrel 66, of proper shape to give the desired configuration to the box or can body to be formed. This horn 66 is provided with longitudinal grooves or depressions in the sides, top and bottom, in order that the desired bends may be given to those portions of the blank which form the sides of the can body. The block 58 is movable up and down, relatively to the horn, to carry the blank against the bottom of the latter, and to this end the block is provided with depending lugs carrying a pin 67, to which is pivotally connected the end of a lever 68 which is pivoted between its ends to a part of the frame and its other end pivoted to a vertically-reciprocating rod 69 secured to a frame 70 which carries the roller 71. This roller 71 bears upon an actuating cam 72 fixed on the main driving shaft 22. Return springs 73 (shown partly broken away in Fig. 2) are connected to the frame 70 and to the base of the machine and serve to give the rods a quick downward return after they have been actuated by their rollers.

It will be apparent that when the main shaft and cam 72 are rotated the block 58 will be moved up and down to alternately force a blank against the horn and release its grip thereon. After the blank has been pressed against the horn, the folding wings are swung to raise the blank and bend or wrap the same around the horn.

There are many ways in which the wings 59 may be operated to effect the blank-forming operation, but I prefer to employ a pair of vertically sliding guide-blocks 76, from each of which extends a stud 74 carrying the loose roller 75. Each wing is provided with a lug or arm, 77, into which is screwed, for purposes of adjustment, the bolt 78 the head of which bears against the roller 75. The guide-blocks 76 are provided with tongues 79, adapted to ride in the guide-way slots 80 in the main frame, and carry, preferably by a bolt connection, the backing-plates 81. To each of these plates is separately pivotally connected a rod 82, pivotally hung at its upper end to a rocking-bar 83 which is pivoted at one end and provided between its ends with a stud on which is journaled a roller 84 adapted to bear upon a cam 85, common to the rollers of both rocking-bars and fixed to the main shaft 22. It will thus be apparent that each folding wing 59 has its independent actuating-roller and connecting-mechanism, although an operating cam common to both rollers is employed. This independent operating mechanism for the backing-plates 81 is employed primarily because it is necessary that one of the folding wings 59 should be started in the folding operation before the other, and continue in this slightly advanced relative position in order that one end of the folded blank may be first finally positioned and the other end of the said blank lapped thereupon for the sealing or securing operation. To accomplish this result, the rocking bars 83 are provided with elongated slots 86 to receive the studs of the rollers, and these studs are so adjusted in the slots 86 that one roller will be in advance of the other in relation to the rotation of the cam. Return-springs 87 are suitably interposed between the vertical connecting rods 82 and the frame of the machine.

When the ends of the blank have been bent around the horn with the ends thereof in overlapped relation, the present invention contemplates means for preliminarily or temporarily securing said ends in this position to each other for subsequent final and permanent sealing without bending or interlocking the edges. I prefer, as a means of final sealing, the soldering of these ends together, and in order to temporarily secure said ends—first, for transmission of the formed blank to the soldering mechanism, and, second, to provide auxiliary or supplementary fastening means—I provide the horn, in its upper face, with a spring-pressed die 88 (best shown in Fig. 7) which is adapted to co-act with a vertically-reciprocating punch slidably mounted in the frame above the horn. This punch comprises a block 89 mounted to slide in a guide-way 90 in the frame and carrying a head 91 in which is fixed a punch-die 92. The punch-die 92 is provided at its lower end with a tooth, or a series of teeth, 93. On the punch-head is a yielding stripper-plate 94, preferably mounted in the head by a bolt passing through elongated slots in the plate, and having pressure means of springs or rubber placed between the upper end thereof and the sliding block 89. The punch-die passes through a slot 95 in the foot of this stripper plate which, by reason of the spring pressure thereon and its sliding connection with the punch-head, will maintain a pressure upon the blank as the punch-die is being raised and withdrawn from the blank, so as to strip and free the latter from the die and thus prevent the punch from dragging upward the joined edges of the blank or one thereof to separate said ends. The teeth in the end of the punch-die coöperate with the die in said horn to form the series of punched-in-depressions 96 in the overlapped ends of the blank, which serve to satisfactorily hold said ends together for the purposes mentioned.

The punch is operated by the cam 97 on the main shaft 22, which acts upon a roller 98 journaled in the sliding punch-block 89. The punch is raised by vertical return springs 99, secured at their lower ends to the block 89 and at their upper ends to a suitable part of the main frame.

As hereinbefore suggested, the above described manner of fastening the ends of the blank together is sufficient to hold the can-body in shape, for purposes of transit, without other securing or fastening means, and in addition thereto, the application of solder not only insures a tighter seam, but in connection with the punched-in depressions increases the permanency and security of the lock.

The can body having been formed on the horn, it is now desired to remove the same for the next succeeding blank-forming operation, and by such removal carry the formed blank to the soldering mechanism. The means shown for shifting the can-body consist of a horizontally-sliding plunger comprising vertical fingers 100, each embracing a side and part of the top of the horn so as to conform to the shape thereof, which fingers are carried by horizontal arms 101 slidably mounted in channels or guideways in the horn. The arms 101 pass through the front part of the frame work and are connected at their inner ends to a lug 102 on the cross-bar 48 of the sliding frame 46, whereby, when the frame and its cross-bar are returned to outermost position, the plunger will be thereby carried outward in the channels of the horn and, through the fingers 100, slide the can-body along the horn to proper position for the first soldering operation.

In the upper face of the horn I have shown a basin 103 (see Fig. 2[a]) adapted to contain a suitable acid or other solder-flux which it is designed to apply automatically to the joint or side-seam of the can body by a brush 104, depending into said basin so that the can-body will be wiped under or against the same. This brush is pivoted at its upper end to a rod 105 carried by an arm 106 fixed on a tube 107 which extends from the frame of the machine and forms a conduit for a gaseous fluid mixture. A gas-pipe 108 and an air-pipe 109 lead to a mixing chamber 110, connected to the tube 107, and supply gas and air for the mixture delivered to the burner that serves to heat the solder-iron. Extending horizontally from the tube 107, are the heaters 111, each comprising a hollow pipe 112 opening at 113 into a housing 114, in which is removably clamped, transversely of the housing, a solder-iron 115. The gaseous mixture is ignited at the opening 113 and the flame-jet is confined within the housing and projects directly against the soldering-iron. By this construction of heater, the heat may be easily regulated and kept constant without wasteful distribution due to exposure to the force of drafts and the soldering-iron may be easily and quickly removed from and attached to the heater. By having the support of the heater serve as a conduit for the gaseous mixture, a very satisfactory and convenient arrangement is effected.

I prefer to employ a plurality of soldering-irons for the purpose of insuring thoroughness in the melting and uniform distribution of the solder. The first of these irons, in the direction of movement of the can body on the horn, is provided with mechanism to intermittently move it vertically, while the remaining soldering-irons are loosely hung. The pipe-support of the first iron is pivotally mounted at 116, and its support is connected to a rod 117 hung on a frame 118, which carries a roller 119 bearing upon and actuated by the cam 120 on the main driving shaft 22. This soldering-iron is adapted to come in contact with and melt the end of a solder-wire 121, and, to enable the wire to be fed intermittently thereunder, is provided with its vertically reciprocating movement. When said first soldering iron descends, it melts a portion of the solder from the end of the solder-wire 121, and as the seam of the can body passes under the iron, the melted solder will be applied thereto. A spring or springs 122 hold the can body firmly down against the horn and the ends of the blank together while the solder is being applied.

The solder-wire is fed intermittently forward through a tube 123 by means of a feed-roller 124, carrying at one end a ratchet-wheel 125 adapted to be actuated by a spring-pressed pawl 126 carried on a rocking frame 127. This rocking frame is operated by a lever 128 which carries at its end a roller 129 bearing upon a cam 130 on the main shaft 22, whereby the lever and rocking arm are rocked to move the ratchet and rotate the feed-wheel. A pressure roller 131 depends against the wire opposite the feed-roller and is yieldingly mounted on the pin of a link 132 which is subject to the pressure of a spring 133. A return-spring is secured at one end to a fixed part of the frame and at the other end to a rectangular extension of the arm, 128.

As has been explained, the cam body which has just been formed is brought into position for the first soldering operation through movement of the fingers 100. By these fingers, the can body is moved along the horn a distance approximately equal to the width of the blank whereby, after this first shifting operation, space is provided for the introduction of the next succeeding blank for another forming operation. After the next succeeding blank has been formed, and the fingers 100 again operate to shift this second can body, formed from said next succeeding blank, to the first soldering mechanism, the last formed body impinges against the first formed body and pushes the latter along the horn to proper position under the second soldering iron, by which the joint is more effectually sealed. In a precisely similar manner, each can body may be passed along any desired number of auxiliary soldering irons, and finally be pushed off the end of the horn through the force of the following can bodies, or be otherwise removed from the horn in any desired manner and delivered into a suitable receptacle for subsequent flanging and heading operations.

It will be noted that all the operating parts of this machine are driven from the main driving shaft—the blank feeding mechanism by a pulley and belt and the other mechanism by cams. The blank is fed from the feed receptacle by the conveyer-belt 28 to a position where the ends thereof are engaged by the lifter arms 39, which are thereupon operated to raise the blank above the feed-level. In this position, the sliding pusher arms 49 in their rearward movement impinge against the end of the blank and push the same upon the presser-block 58. This block is then lifted by its cam mechanism so as to carry the blank against the forming-horn 66, and immediately thereafter the folding-wings 59 are swung upon their pivots by the sliding blocks 76, and the ends of the blanks are thereby bent or wrapped around the horn to form the can body, one wing acting in advance of the other and the blank being of suitable length so that the ends thereof will be overlapped. The punch then descends and forms the engaging depressions, whereby the ends of the can body are secured in their overlapped condition with only two thicknesses or layers of metal at the seam. The can body so formed is then carried forward on the horn, first by action of the sliding plunger fingers 100 and subsequently by the following can body, to the soldering mechanisms, where the solder is applied by the irons 115 held in the heaters 111, and then the can body is removed or forced from the horn.

Many modifications of minor details in my improved machine for making can bodies will doubtless readily suggest themselves to those skilled in the art to which it appertains, and I therefore do not desire to limit my invention to the specific construction herein shown and described.

I claim as new and desire to secure by Letters Patent:

1. In a machine for making can bodies, the combination, with means for folding a blank with the flat end-edges thereof in overlapped relation, of means for removing the formed blank from the folding mechanism and by such removal advancing the previously formed blank, and means for soldering the unbent and overlapped end-edges of each in transit.

2. In a machine for making can bodies, the combination, with means for folding a blank with the flat end-edges thereof in overlapped relation, of means for removing the formed blank from the folding mechanism and by such removal advancing the previously formed blanks successively to the point of final delivery, and means for soldering the unbent and overlapped end-edges of each in transit.

3. In a machine for making can bodies, the combination, with means for holding a blank with the flat end edges thereof in overlapped relation, of means for removing the formed blank from the folding mechanism and by such removal advancing the previously-formed blank, means for retaining said end edges in overlapped relation preliminary to soldering, said retaining means providing an auxiliary seal, and means for soldering the overlapped end edges of each blank in transit.

4. In a machine for making can bodies, the combination, with means for folding a blank with the flat end edges thereof in overlapped relation, of means for removing the formed blank from the mechanism and by such removal advancing the previously-formed blanks successively to the point of final delivery, means for retaining said end edges in overlapped relation preliminary to soldering, said retaining means providing an auxiliary seal, and means for soldering the overlapped end edges of said blanks in transit.

5. In a machine for making can bodies, the combination, with means for folding a blank with the flat end-edges thereof in overlapped relation, of means for removing the formed body from the folding mechanism and by such removal advancing the previously formed blank, means for soldering the overlapped end-edges of each in transit, and means for providing an auxiliary seal to retain said edges in unbent and overlapped relation preliminary to soldering.

6. In a machine for making can bodies, the combination, with means for folding a blank with the flat end-edges thereof in overlapped relation, of means for removing the formed body from the folding mechanism and by such removal advancing the previously formed blanks successively to the point of final delivery, means for soldering the overlapped end-edges of each in transit, and means for providing an auxiliary seal to retain said edges in unbent and overlapped relation preliminary to soldering.

7. A machine for making can-bodies having a mechanism for overlapping the end portions of a blank flat one upon the other, and a locking-punch for locking said end portions together with unbent continuous side edges and flat outer surface, substantially as described.

8. In a machine for making can bodies, in combination with a mechanism for overlapping the end portions of the body flat one upon the other, a punch extending parallel to the end edges and short of the side edges for forming interlocking projections in the end portions, whereby said end portions are locked together flat one upon the other with unbent side edges, substantially as described.

9. A machine for making can bodies, having a forming-horn, in combination with successively-operating blank-folding and end-overlapping wings, a lock-forming punch operative between the end edges of the blank, and means to operate said punch while the end portions are held lapped one upon the other to lock the same together with unbent side edges, substantially as described.

10. A machine for making can bodies, having a forming-horn, in combination with successively-operating blank-bending wings, a vertically-reciprocating punch, said punch having a toothed die, and a coöperating die in said horn, substantially as described.

11. A machine for making can bodies, having in combination with a forming mechanism, a lock-forming punch, provided with a toothed die, and a stripper on said punch, substantially as described.

12. A machine for making can bodies, having a forming mechanism, in combination with a lock-forming punch, a stripping-plate slidably mounted on said punch, and yielding pressure means bearing on said stripping-plate, and means to vertically reciprocate said punch, substantially as described.

13. A machine for making can bodies, having in combination a forming mechanism, means for overlapping the end portions of the body flap one upon the other, a punch operating between the end edges for locking the end portions together in flat lapped parallel arrangement with unbent side edges, and a soldering mechanism for the lap-joint, substantially as described.

14. A machine for making can bodies, having in combination a forming-horn, means for forming the can-body on said horn, a toothed punch operating between the end edges of the lapped portions to lock said portions together with unbent side edges, a soldering mechanism, and a body-shifting plunger, substantially as described.

15. A machine for forming can bodies, having a forming-horn, in combination with a lapped-end-bending mechanism, a locking mechanism consisting of a vertically-reciprocating toothed punch whereby the ends of the can-body are locked without bending the edges, a soldering mechanism, and a plunger for shifting the locked can to the soldering mechanism substantially as described.

16. A machine for making can bodies, having a blank-feeding mechanism, in combination with a body-forming mechanism, comprising means for lapping the ends flat, one upon the other, a transferring mechanism between the feeding and forming mechanisms, means for locking the ends in said lapped position with continuous side edges whereby only two thicknesses are formed at the junction of the body, a soldering mechanism, and a means for shifting said locked can body to said soldering mechanism, substantially as described.

17. A machine for making can bodies, having a main shaft, in connection with a lapped-end body-forming mechanism, a lock-forming piercing-punch, operating between the end edges of the lapped-end portions, cams on said main shaft for successively operating said mechanisms, and a soldering mechanism, substantially as described.

18. A machine for making can bodies, having a blank-feeding mechanism, consisting of an endless conveyer, rolls for operating said conveyer, in combination with a feed-receptacle through which said conveyer passes, a blank-stop, and means to release said blank-stop, substantially as described.

19. A machine for making can bodies, having a blank-feeding conveyer-belt, a series of upper and a series of lower rollers for said belt, whereby the belt will be carried below the feeding-level at intervals, and a lifting mechanism operating in the spaces at said intervals to raise the blank from and above the conveyer, substantially as described.

20. A machine for making can bodies, having a blank-receptacle, a blank-feeding conveyer-belt, leading from said receptacle and transversely to the forming-block, in combination with a blank-lifting mechanism, and a pusher for moving the blank from the lifter to the forming-block, substantially as described.

21. A machine for making can bodies, having in combination a horizontally-traveling conveyer-belt, vertically-reciprocating lifter-arms, and a sliding pusher-frame operating transversely to the belt, substantially as described.

22. A machine for making can bodies, having a conveyer-belt, in combination with lifter-arms movable in interrupted spaces in the belt, a horizontally-sliding pusher-frame, a main shaft, and cams on said shaft for vertically raising said lifter-arms, and sliding said frame, substantially as described.

23. A machine for making can bodies, having a forming-block, means for positioning a blank in front of said block, a horizontally-sliding frame adapted to push said blank from said positioning means to said block, arms on said frame adapted to contact with the blank to move it in one direction, and plunger-fingers also carried by the frame to move the blank in the opposite direction, in combination with an actuating rocking lever for the frame, a main shaft, and a cam on said main shaft which operates said lever, substantially as described.

24. A machine for making can bodies, having a forming-block, means for positioning a blank in front of said block, a horizontally-sliding frame adapted to push said blank from said positioning means to said block, arms on said frame adapted to contact with a blank to move it in one direction and plunger-fingers also carried by the frame to move it in the opposite direction, in combination with actuating rocking levers for the frame, a main shaft, a cam on said main shaft for rocking said levers and sliding the frame in one direction, and a spring for sliding the frame in the other direction, substantially as described.

25. A machine for making can bodies having a fixed forming-horn, in combination with a vertically-movable presser-block below said horn, a blank-feeding belt extending parallel with the width of said block, means to feed a single blank at a time by said belt, vertically-movable arms for lifting said blank from said belt, and a horizontal, reciprocating pusher-frame for pushing said blank from said lifting-arms to said block, substantially as described.

26. A machine for making can bodies, having a forming-horn, in combination with pivotally-swinging blank-bending wings, vertically-sliding blocks separate from said wings, said blocks provided with studs, said wings adapted to bear on said studs, a vertically-moving rod for each sliding block, a rocking mechanism for each rod, separate, successively-operated rollers for each rocking mechanism, and means for operating said rollers, substantially as described.

27. A machine for making can bodies, having a forming-horn, in combination with successively-actuated blank-bending wings, each operated by an adjustable roller bearing upon a cam common to both rollers, said rollers having their centers out of line, substantially as described.

28. A machine for making can bodies, having a forming-horn, in combination with blank-bending wings, independent successively-actuated rollers for said wings, connections between each roller and its wing, and a cam common to both rollers for actuating the same, a toothed punch for locking the flat lapped ends of the can-body and a cam for actuating said punch, and means for successively operating said wing-cam and punch-cam, substantially as described.

29. A machine for making can bodies, having a forming-horn, in combination with a presser-block, a reciprocating sliding pusher-frame, operated in one direction to move a blank to said block, means for operating said pusher-frame, a can-body-shifting plunger, said plunger connected to said pusher-frame, and operated in the opposite direction to shift a can on said horn by the return movement of said frame, substantially as described.

30. A machine for making can bodies, having blank-bending wings, in combination with fixed horizonal blank-supporting lugs alined with and independent of said wings and vertical stops for the blank at the edges of the lugs, substantially as described.

31. A machine for making can bodies, having blank-bending wings provided with recesses and guide-lugs at each end on each side thereof, substantially as described.

32. A machine for making can bodies, having a soldering mechanism provided with a plurality of soldering-irons, means to positively reciprocate one of said irons vertically, the remainder of said irons being loosely hung, in combination with means for feeding a strip of solder under said reciprocating iron, substantially as described.

33. A heater for soldering-irons having a housing for the iron, a hollow conduit-support, an opening into the housing from said conduit-support, and said conduit-support being suitably connected to a suitable source of fuel-supply, substantially as described.

34. A machine for making can bodies, having a solder-feed mechanism consisting of a feed-roller and a pressure-roller, a rocking frame, a solder-guide tube carried by said frame, a ratchet-wheel on said feed-roller, a ratchet on said frame, and a cam for actuating said frame, whereby, when the frame is rocked in one direction the solder will be advanced by the roller and when rocked in the opposite direction the tube will be withdrawn to expose a portion of the solder, substantially as described.

35. A machine for making can bodies, having in combination a blank-feeding mechanism, a blank-lifting mechanism, a pushing mechanism, a mechanism for forming a can-body with lapped ends, and flat, unbent-edges, a lock-forming punch to lock said body in such form, a can-body-shifting mechanism, and a soldering mechanism, substantially as described.

In testimony of the foregoing, I have hereunto set my hand in the presence of two subscribing witnesses.

JULIUS BRENZINGER.

Witnesses:

FRED H. BOWERSOCK,
P. FRANK SONNEK.